United States Patent
Oh et al.

(10) Patent No.: US 12,266,093 B2
(45) Date of Patent: Apr. 1, 2025

(54) BATTERY CELL ELECTRODE ALIGNMENT INSPECTION METHOD FOR BATTERY PACK OF VEHICLE

(71) Applicants: Hyundai Motor Company, Seoul (KR); Kia Corporation, Seoul (KR)

(72) Inventors: Hokyeong Oh, Seoul (KR); Seho Kwon, Gyeonggi-do (KR); Jinho Ban, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 539 days.

(21) Appl. No.: 17/678,480

(22) Filed: Feb. 23, 2022

(65) Prior Publication Data

US 2023/0074096 A1 Mar. 9, 2023

(30) Foreign Application Priority Data

Sep. 6, 2021 (KR) ........................ 10-2021-0118444

(51) Int. Cl.
  *G06T 7/00* (2017.01)
  *H01M 10/04* (2006.01)
(52) U.S. Cl.
  CPC ....... *G06T 7/0006* (2013.01); *H01M 10/0459* (2013.01); *G06T 2207/10116* (2013.01); *G06T 2207/30164* (2013.01); *G06T 2207/30204* (2013.01); *H01M 2220/20* (2013.01)
(58) Field of Classification Search
  None
  See application file for complete search history.

(56) References Cited

U.S. PATENT DOCUMENTS

2012/0079710 A1* 4/2012 Bertness ................ B60L 50/66
  29/593
2019/0341658 A1* 11/2019 Han .................... H01M 10/052

FOREIGN PATENT DOCUMENTS

| CN | 113108728 A | * | 7/2021 | ............. G01B 15/00 |
| KR | 101133048 B1 | | 4/2012 | |
| KR | 101272556 B1 | | 6/2013 | |
| KR | 2017-0016179 A | | 2/2017 | |

\* cited by examiner

*Primary Examiner* — Ian L Lemieux
*Assistant Examiner* — Promotto Tajrian Islam
(74) *Attorney, Agent, or Firm* — Fox Rothschild LLP

(57) ABSTRACT

A battery cell electrode alignment inspection method for inspecting an alignment state of a jelly roll configured of negative and positive electrode plates and a separator of a battery cell includes: obtaining electrode vision image data by capturing vision images of individual negative and positive electrode plates configuring the jelly roll by a vision camera; obtaining dimensional data of the individual negative and positive electrode plates; storing the obtained dimensional data of the individual negative and positive electrode plates; marking a cell barcode for identification of the jelly roll; scanning the cell barcode to receive dimensional data of individual negative and positive electrode plates; X-ray-capturing the jelly roll to obtain X-ray image data of the individual negative and positive electrode plates; and substituting the dimensional data of the individual negative and positive electrode plates to the obtained X-ray images of the individual negative and positive electrode plates.

14 Claims, 13 Drawing Sheets

(a)

(b)

(a)

(b)

(a)

(b)

(a)

(b)

(a)

(b)

BATTERY CELL ELECTRODE ALIGNMENT INSPECTION METHOD FOR BATTERY PACK OF VEHICLE

CROSS-REFERENCE TO RELATED APPLICATION

This application claims under 35 U.S.C. § 119(a) the benefit of Korean Patent Application No. 10-2021-0118444 filed in the Korean Intellectual Property Office on Sep. 6, 2021, the entire contents of which are incorporated herein by reference.

BACKGROUND

(a) Technical Field

The present disclosure relates to a battery cell electrode alignment inspection method for a battery pack of a vehicle, more particularly, to the battery cell electrode alignment inspection method that utilizes an X-ray.

(b) Description of the Related Art

Generally, a battery pack for an environmentally-friendly vehicle, by assembling a plurality of battery cells to form a battery module and then by assembling a plurality of battery modules, is manufactured in the form of a battery pack that is finally mounted on the vehicle. This type of battery module satisfies a required voltage and capacity standard by stacking and bonding a predetermined number of battery cells and then by assembling them.

However, when a plurality of battery cells are stacked, it is important to manage a battery cell stacking alignment in order to ensure assembly quality of additional parts in a post-process, quality of electrical connection therebetween, and cooling performance. The battery cell includes a negative electrode plate, a positive electrode plate, and a separator interposed between the negative electrode plate and the positive electrode plate, where the negative electrode plate is provided with a negative electrode lead, and the positive electrode plate is provided with a positive electrode lead. This battery cell is surrounded by a pouch in a structure in which the negative electrode plate, the separator, and the positive electrode plate are sequentially stacked, that is, in the form of a jelly roll.

Conventionally, in order to inspect alignment of the negative and positive electrode plates of the battery cell, it is determined whether a gap occurs between the negative and positive electrode plates at two points in an edge area of the jelly roll, but an error of the alignment inspection may occur because of measuring the gap in a diagonal direction of the jelly roll.

In addition, in order to inspect an accurate alignment between closest adjacent negative and positive electrode plates, it is necessary to measure the gaps between at least three points in the edge area of the jelly roll, and in this case, when an inspection point is added in the edge area of the jelly roll, units per hour (UPH; production per hour) may be reduced due to an increase in inspection time.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a battery cell electrode alignment inspection method that may measure gap dimensional data between a negative electrode plate and a positive electrode plate at two points in an edge area of a jelly roll of a battery cell, and may reflect it on an image obtained by X-ray imaging to calculate an accurate gap between closest electrode plates, thereby performing a pass/fail inspection based on accurate alignment information.

An embodiment of the present disclosure provides a battery cell electrode alignment inspection method that inspects an alignment state of a jelly roll configured of negative and positive electrode plates and a separator of a battery cell, including: obtaining electrode vision image data by capturing vision images of individual negative and positive electrode plates configuring the jelly roll by a vision camera; obtaining dimensional data of the individual negative and positive electrode plates by analyzing the electrode vision image data; storing the obtained dimensional data of the individual negative and positive electrode plates in a server; marking a cell barcode for identification of the jelly roll; scanning, by a barcode scanner, the cell barcode to receive dimensional data of individual negative and positive electrode plates of a corresponding jelly roll from the server; X-ray-capturing, by an X-ray projector, the jelly roll to obtain X-ray image data of the individual negative and positive electrode plates; and substituting the dimensional data of the individual negative and positive electrode plates to the obtained X-ray images of the individual negative and positive electrode plates to derive positions of the individual negative and positive electrode plates and to calculate a gap between closest adjacent ones of the individual negative and positive electrode plates.

The obtaining of the electrode vision image data may be performed by capturing the vision images of the individual negative and positive electrode plates by the vision camera in a state in which the negative and positive electrode plates are placed on the separator of the jelly roll, respectively.

The jelly roll may be manufactured by folding connected separators in one direction or stacking a plurality of separated separators side by side.

The obtaining of the electrode vision image data may be performed by stacking the individual negative and positive electrode plates on the separator of the jelly roll after capturing the vision images of the individual negative and positive electrode plates, respectively.

The jelly roll may be manufactured through z-stacking in which a plurality of the connected separators are folded in a zigzag shape.

In the marking of the cell barcode, the cell barcode may be formed on a negative electrode lead surface formed at an end portion of the negative electrode plate or a positive electrode lead surface formed at an end portion of the positive electrode plate.

In the obtaining of the electrode vision image data, length data of cutting widths and an inner width of V-grooves formed at both corners of the individual negative and positive electrode plates may be obtained.

The cutting width of the V groove, after recognizing end point positions of the individual negative and positive electrode plates from the electrode vision image data and recognizing a cutting edge position from a preset and registered V-groove pattern, may be calculated as a length between the end point position and the cutting edge position.

The inner width may be calculated as a length between the cutting edge positions on both sides of the individual negative and positive electrode plates.

In the obtaining of the X-ray image data, X-ray image data detected by the X-Ray detector may be obtained by using X-ray beams that are projected from the X-ray projector toward two points of corner areas on both sides of the jelly roll.

The X-ray beam projected from the X-ray projector may be incident at an angle of 45° with respect to one surface of the jelly roll toward the X-ray detector.

The obtaining of the X-ray image data may include: determining end lines of the individual negative and positive electrode plates in the captured X-ray image; and obtaining dimensional data of the individual negative and positive electrode plates by measuring a distance from a preset reference line parallel to the end lines of the individual negative and positive electrode plates.

The calculating of the gap between the individual negative and positive electrode plates may include: fixing a line connecting the inner widths of the individual negative and positive electrode plates obtained in the obtaining of the electrode vision image data and a line connecting two points at which both end lines of the individual negative and positive electrode plates obtained in the obtaining of the X-ray image data meet as the widths of the individual negative and positive electrode plates to derive images of the individual negative and positive electrode plates based on the widths of the individual negative and positive electrode plates; and calculating, after overlapping the images of the individual negative and positive electrode plates, a gap between an end line of the individual negative electrode plate and an end line of the positive electrode plate.

The gap between the individual negative and positive electrode plates may be calculated as a gap between the closest adjacent ones of the individual negative and positive electrode plates; and when calculating a plurality of the gaps and when a value of the calculated gap is reversed, a corresponding negative or positive electrode plate may be determined to be unsatisfactory in alignment specification.

According to the present disclosure, it is possible to determine alignment of positive and negative electrodes of a jelly roll by merging electrode vision image data obtained by a vision camera and X-ray image data obtained by an X-ray detector, so that it is possible to reduce a possibility of false-determination due to lack of dimensional data and improve inspection reliability.

In addition, since it is possible to accurately determine alignment between the closest adjacent positive and negative electrodes only by X-ray imaging at two corners of a jelly roll, it is possible to reduce an inspection time per jelly roll to increase production efficiency, and to enhance product stability.

In addition, since the same inspection method may be applied to various jelly roll manufacturing methods such as folding, stacking, and the like, applicability of the present disclosure is improved, and commonality thereof is enhanced.

DETAILED DESCRIPTION OF THE EMBODIMENTS

Figure 1:
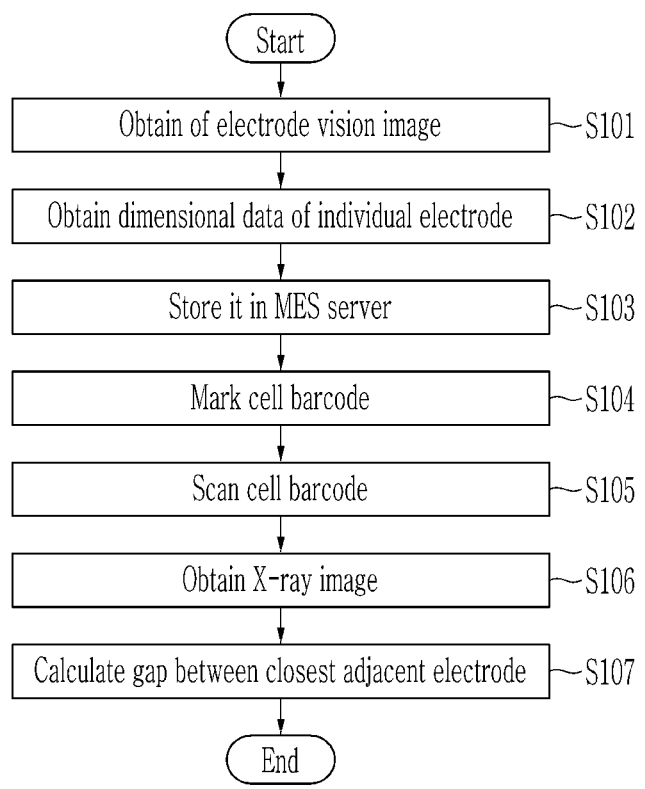
FIG. 1 illustrates a flowchart of a battery cell electrode alignment inspection method according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Further, with embodiments of the present disclosure, detailed description is made as to the constituent elements in a first embodiment with reference to the relevant drawings by using the same reference numerals for the same constituent elements, while only the constituent elements different from those related to the first embodiment are described in other embodiments.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. In addition, like structures, elements, or components illustrated in two or more drawings use same reference numerals for showing similar features. It will be understood that when an element such as a layer, film, region, area, or substrate is referred to as being "on" another element, it can be directly on the other element or intervening elements may also be present.

The embodiment of the present disclosure shows an embodiment of the present disclosure in detail. As a result, various modifications of the drawings will be expected. Therefore, the embodiments are not limited to a specific shape of an illustrated region, but, for example, include a change in the shape in accordance with manufacturing.

Hereinafter, a battery cell electrode alignment inspection method according to an embodiment of the present disclosure will be described with reference to FIG. 1 and FIG. 2.

Figure 2:
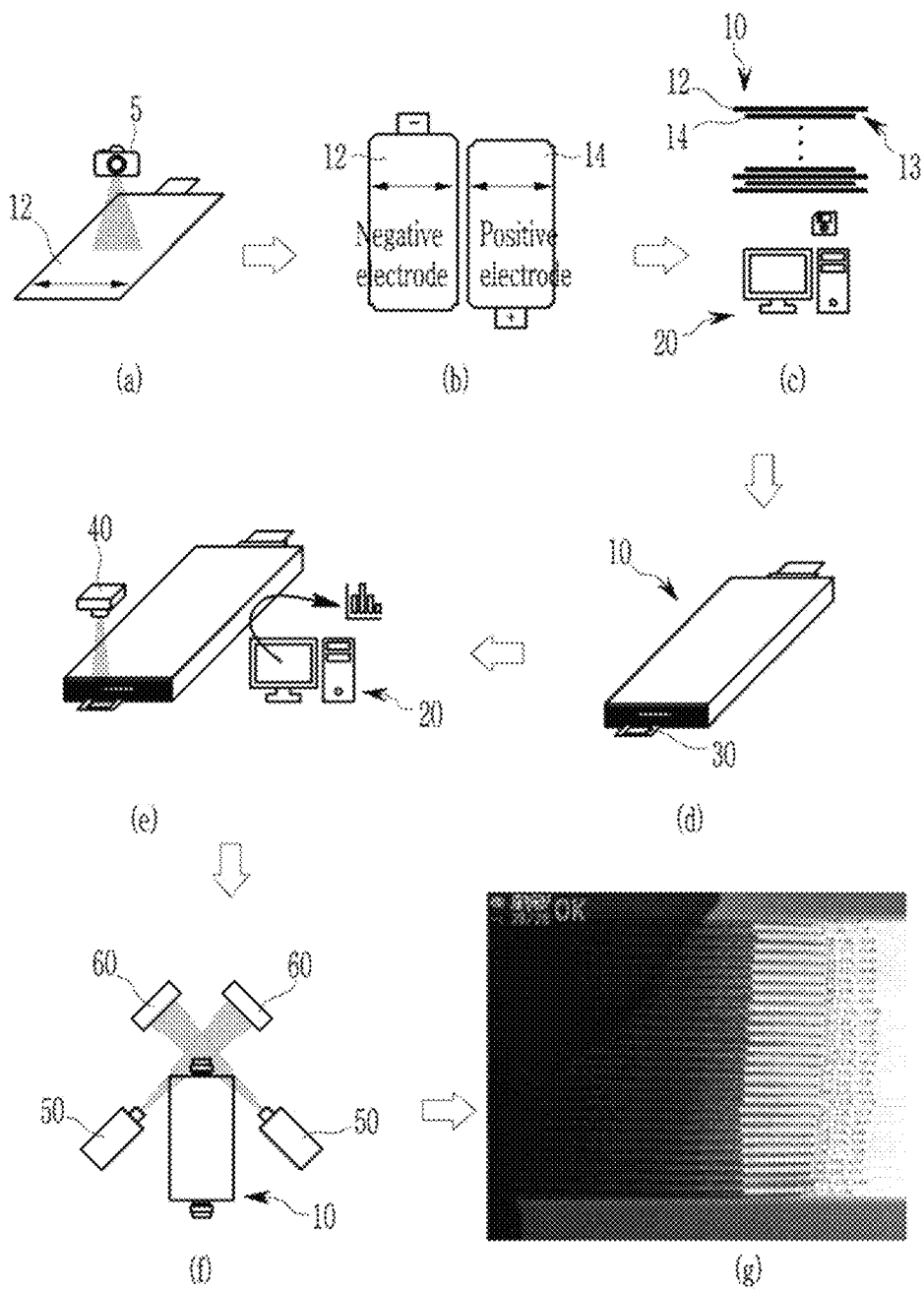
FIG. 2 illustrates a schematic view of a battery cell electrode alignment inspection method according to an embodiment of the present disclosure.

FIG. 1 illustrates a flowchart of a battery cell electrode alignment inspection method according to an embodiment of the present disclosure, and FIG. 2 illustrates a schematic view of a battery cell electrode alignment inspection method according to an embodiment of the present disclosure.

Referring to FIG. 1 and FIG. 2, a battery cell electrode alignment inspection method according to an embodiment of the present disclosure is a battery cell electrode alignment inspection method for inspecting an alignment state of a jelly roll 10 configured of a negative electrode plate 12 and a positive electrode plate 14 of a battery cell and a separator 13, and includes obtaining electrode vision image data by first capturing vision images of the individual negative electrode plates 12 and positive electrode plates 14 configuring the jelly roll 10 by a vision camera 5 (S101) (FIG. 2 (a)).

Before the jelly roll 10 is manufactured, electrode vision images of all individual negative electrode plates 12 and positive electrode plates 14 are captured by using the vision camera 5. The vision camera 5 is positioned above surfaces of the individual negative electrode plate 12 and positive electrode plate 14 to capture the individual negative electrode plate 12 and positive electrode plate 14 in a vertical direction, and obtains dimensional data by using the captured image data.

Figure 3:
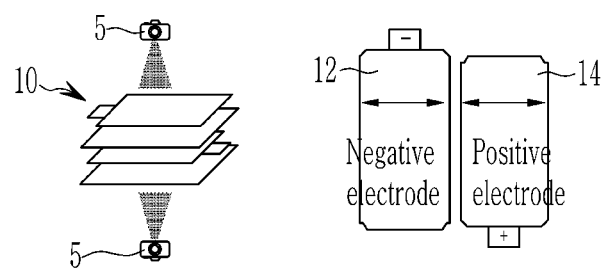
FIG. 3 illustrates a schematic view of an example of obtaining electrode vision image data in a battery cell electrode alignment inspection method according to an embodiment of the present disclosure.
Figure 3:
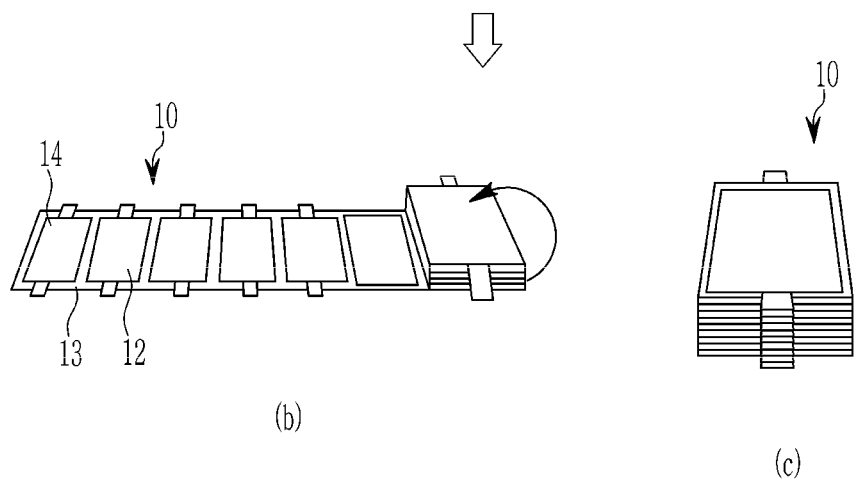
Figure 3:
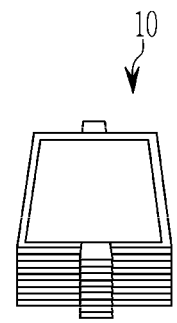
Figure 4:
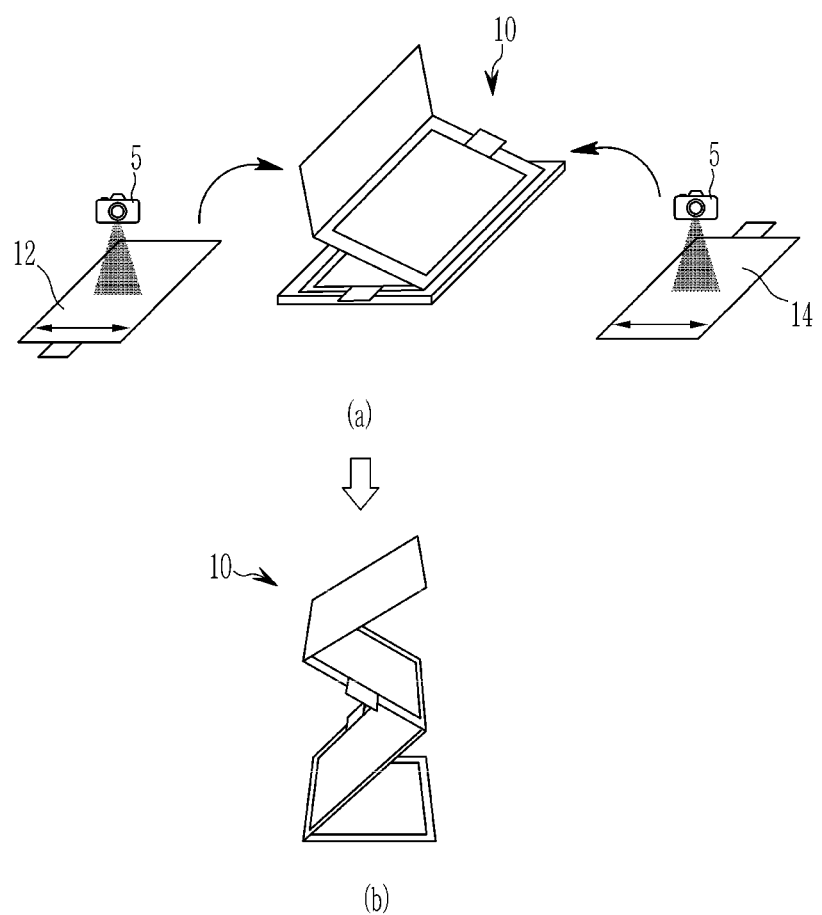
FIG. 4 illustrates a schematic view of another example of obtaining electrode vision image data in a battery cell electrode alignment inspection method according to an embodiment of the present disclosure.

FIG. 3 illustrates a schematic view of an example of obtaining electrode vision image data in a battery cell electrode alignment inspection method according to an embodiment of the present disclosure, and FIG. 4 illustrates a schematic view of another example of obtaining electrode vision image data in a battery cell electrode alignment inspection method according to an embodiment of the present disclosure.

As shown in FIG. 3, in a semi-finished state with individual negative electrode plates 12 and positive electrode plates 14 respectively placed on upper and lower surfaces of the separator 13 of the jelly roll 10, electrode vision images of the individual negative electrode plate 12 and positive electrode plate 14 may be captured by the vision camera 5, respectively (FIG. 3 (a)). After the electrode vision image is captured, the jelly roll 10 may be manufactured by folding connected separators 13 in one direction or stacking a plurality of separated separators 13 side by side (FIG. 3 (b)).

In addition, as shown in FIG. 4, after respectively capturing vision images of the individual negative electrode plate 12 and positive electrode plate 14 by the vision camera 5, the jelly roll 10 may be manufactured by stacking the individual negative electrode plate 12 and positive electrode plate 14 on respective surfaces of the separator 13, respectively (FIG. 4 (a)). In this case, the jelly roll 10 may be manufactured through z-stacking in which a plurality of connected separators 13 are folded in a zigzag shape (FIG. 4 (b)).

Then, the captured electrode vision image data is analyzed to obtain dimensional data of the individual negative electrode plate 12 and positive electrode plate 14 (S102) (FIG. 2 (b)). Then, the obtained dimensional data of the individual negative electrode plate 12 and positive electrode plate 14 are stored in a server, e.g., a manufacturing execution system (MES) server 20 (S103) (FIG. 2 (c)).

Figure 5:
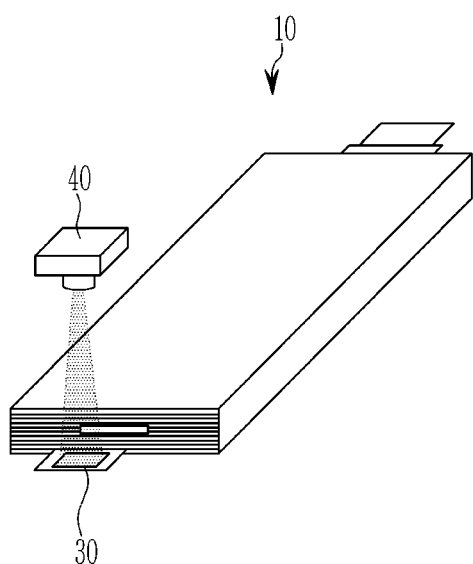
FIG. 5 illustrates a schematic view of scanning a cell barcode in a battery cell electrode alignment inspection method according to an embodiment of the present disclosure.

Thereafter, the manufactured jelly roll 10 is marked with a cell barcode 30 for identification of the jelly roll 10 (S104) (FIG. 2 (d)). FIG. 5 illustrates a schematic view of scanning a cell barcode in a battery cell electrode alignment inspection method according to an embodiment of the present disclosure. As shown in FIG. 5, the cell barcode 30 may be formed on a negative electrode lead surface formed on an end portion of the negative electrode plate 12, or a positive electrode lead surface formed on an end portion of the positive electrode plate 14. In addition, the cell barcode 30 may be marked on both the negative electrode lead surface and the positive electrode lead surface.

Then, a barcode scanner 40 scans the cell barcode 30 to receive dimensional data of the individual negative electrode plate 12 and positive electrode plate 14 of a corresponding jelly roll 10 from the MES server 20 (S105) (FIG. 2 (*e*)).

Figure 7:
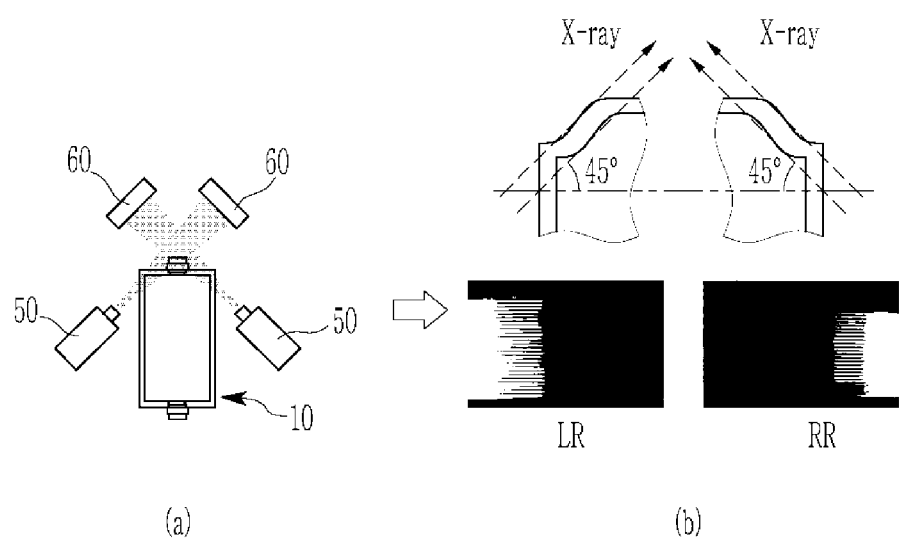
FIG. 7 illustrates a schematic view of obtaining X-ray image data in a battery cell electrode alignment inspection method according to an embodiment of the present disclosure.

Then, the jelly roll 10 is X-rayed by the X-ray projector 50 to obtain X-ray image data of the individual negative electrode plate 12 and positive electrode plate 14 (S106) (FIG. 2 (*f*)). FIG. 7 illustrates a schematic view of obtaining X-ray image data in a battery cell electrode alignment inspection method according to an embodiment of the present disclosure. As shown in FIG. 7, the X-ray projector 50 projects an X-ray beam toward two points of both edge areas of the jelly roll 10, and the X-ray beam may be incident on a X-ray detector 60 that is positioned to face the X-ray projector 50, and may obtain X-ray image data (FIG. 7 (*a*)). The X-ray beam projected from the X-ray projector 50 may be incident at an angle of 45° with respect to one surface of the jelly roll 10 toward the X-ray detector 60 (FIG. 7 (*b*)).

Then, by substituting the dimensional data of the individual negative electrode plate 12 and positive electrode plate 14 obtained by analyzing the electrode vision image data into the X-ray image data to derive positions of the individual negative electrode plate 12 and positive electrode plate 14, a gap between a closest adjacent individual negative electrode plate 12 and a positive electrode plate 14 is calculated (S107) (FIG. 2 (*g*)).

The calculated value of the gap between the individual negative electrode plate 12 and positive electrode plate 14 is positive (+) or negative (−), and when gaps between a plurality of individual negative electrode plates 12 and positive electrode plates 14 are calculated and when the calculated gap values are not equally positive (+) or negative (−), the corresponding negative electrode plate 12 or positive electrode plate 14 is determined to be unsatisfactory in alignment specification, while when the calculated gap values are equally positive (+) or negative (−), the corresponding negative electrode plate 12 or positive electrode plate 14 is determined to be satisfactory in alignment specification.

Figure 6:
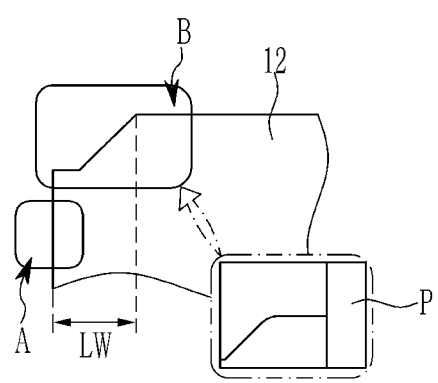
FIG. 6 illustrates a schematic view of obtaining electrode vision image data in a battery cell electrode alignment inspection method according to an embodiment of the present disclosure.
Figure 6:
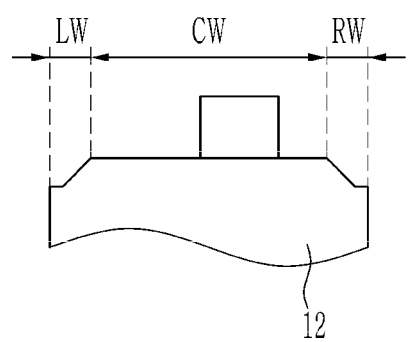

FIG. 6 illustrates a schematic view of obtaining electrode vision image data in a battery cell electrode alignment inspection method according to an embodiment of the present disclosure.

Referring to FIG. 6, in the obtaining of the electrode vision image data (S101), length data of cutting widths LW and RW and an inner width CW of V-grooves formed in both corners of the individual negative electrode plate 12 and positive electrode plate 14 are obtained. In the electrode vision image obtained by the vision camera 5, an end point position is recognized in area 'A' of the negative electrode plate 12, and a cutting edge position is recognized by finding a similar part from a preset and registered V-groove pattern in area 'B'. Then, the length LW between the end point position and the cutting edge position is measured (FIG. 6 (*a*)). Similarly to the measuring of the length LW between the left end point position and the cutting edge position of the negative electrode plate 12, the length RW between the right end point position and the cutting edge position of the negative electrode plate 12 is also measured. The length between the left and right cutting edge positions is measured as the inner width CW (FIG. 6 (*b*)). In this way, the dimensional data of both the individual negative electrode plate 12 and positive electrode plate 14 may be measured and obtained, and the obtained dimensional data are stored in the MES server 20.

Figure 8:
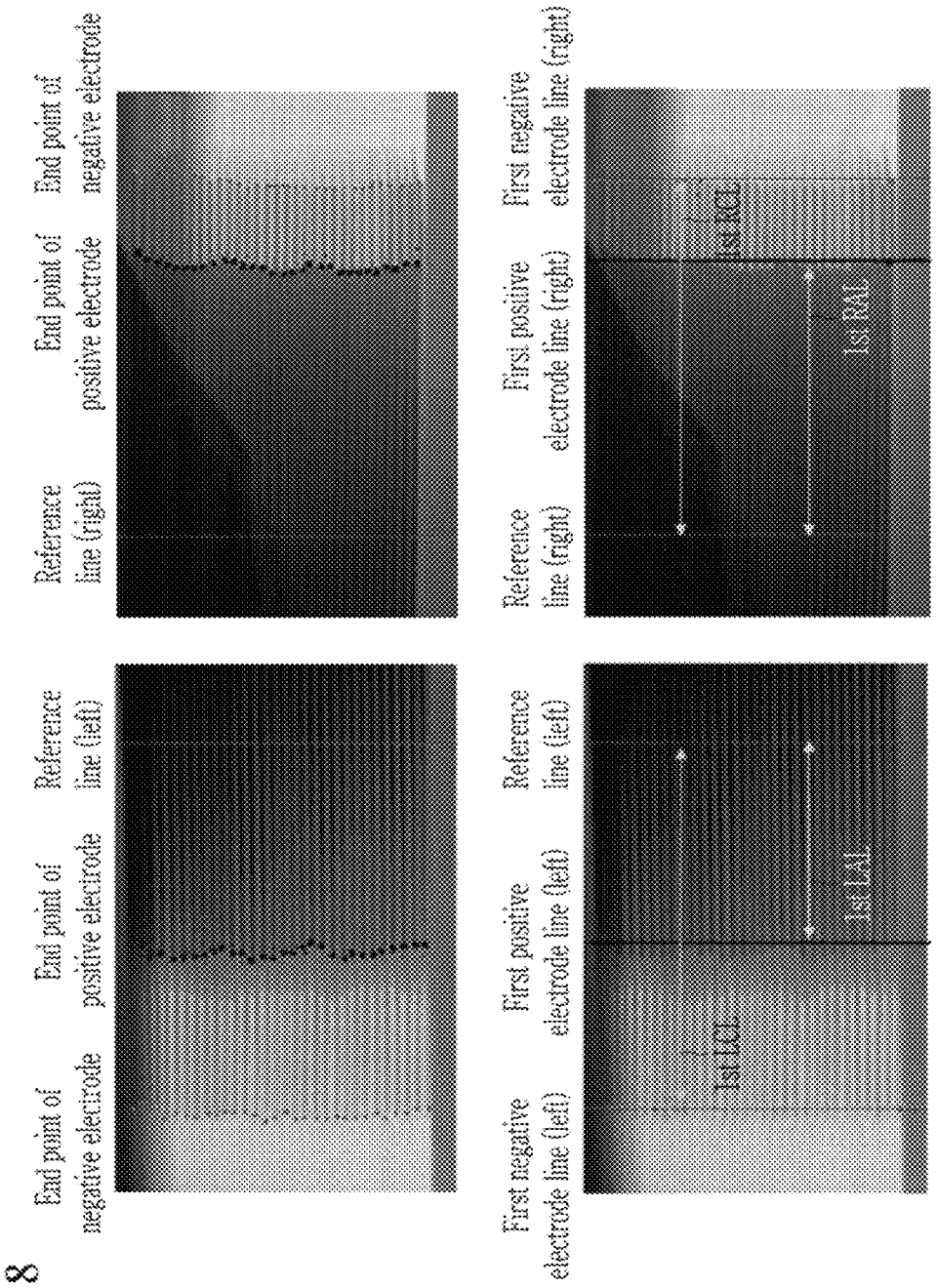
FIG. 8 illustrates a schematic view of a state of obtaining dimensional data of individual negative and positive electrode plates in obtaining X-ray image data in a battery cell electrode alignment inspection method according to an embodiment of the present disclosure.
Figure 9:
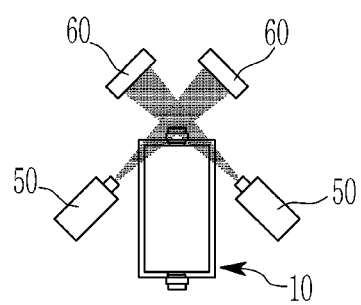
FIG. 9 illustrates, on an XY plane, dimensional data of individual negative and positive electrode plates obtained in obtaining X-ray image data in a battery cell electrode alignment inspection method according to an embodiment of the present disclosure.
Figure 9:
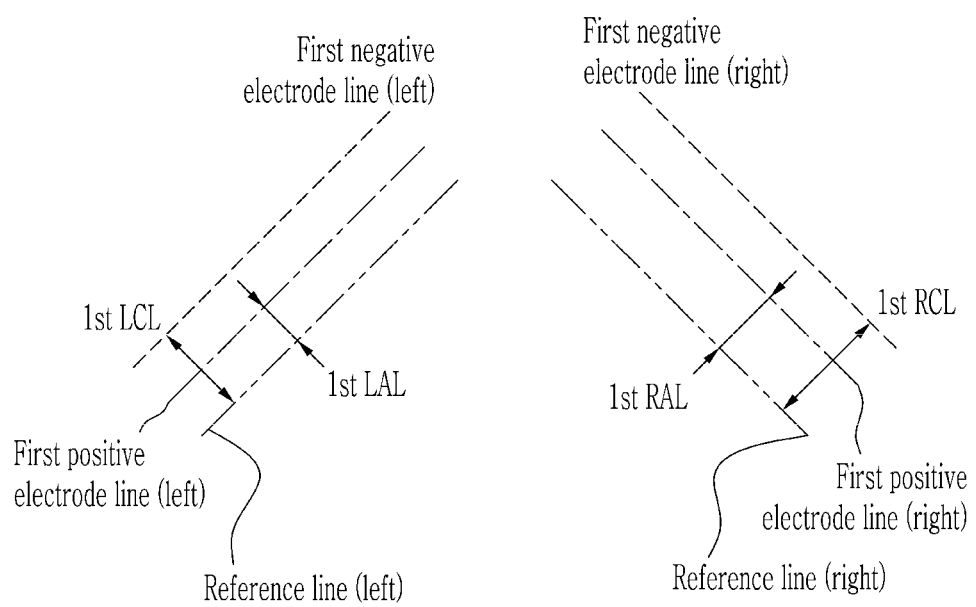

FIG. 8 illustrates a schematic view of a state of obtaining dimensional data of individual negative and positive electrode plates in obtaining X-ray image data in a battery cell electrode alignment inspection method according to an embodiment of the present disclosure, and FIG. 9 illustrates, on an XY plane, dimensional data of individual negative and positive electrode plates obtained in obtaining X-ray image data in a battery cell electrode alignment inspection method according to an embodiment of the present disclosure.

Referring to FIG. 9, the X-ray beams projected from the X-ray projector 50 toward the two points of the corner areas on both sides of the jelly roll 10 are detected by the X-ray detector 60 to obtain the X-ray image data, and the end points of the individual negative electrode plate 12 and positive electrode plates 14 are determined from the captured X-ray image (FIG. 9 (*a*)). As shown in FIG. 9, through the left and right end points of one negative electrode plate 12 and positive electrode plate 14 among the plurality of individual negative electrode plates 12 and positive electrode plates 14, left and right negative electrode end lines and left and right positive electrode end lines parallel to preset left and right reference lines are determined, and distances $1^{st}$ LCL, $1^{st}$ RCL, $1^{st}$ RAL, and $1^{st}$ LAL between the left and right negative electrode end lines and the left and right positive electrode end lines and the left and right reference lines are measured, respectively (FIG. 9 (*b*)). In this case, the distance between the preset left and right reference lines is a set value, and is not changed. In this way, with respect to the plurality of individual negative electrode plates 12 and positive electrode plates 14, by measuring the distances between the end lines thereof and the reference line, it is possible to obtain the dimensional data. As shown in FIG. 9, the obtained dimensional data may be shown on the XY plane (FIG. 9 (*b*)).

Figure 10:
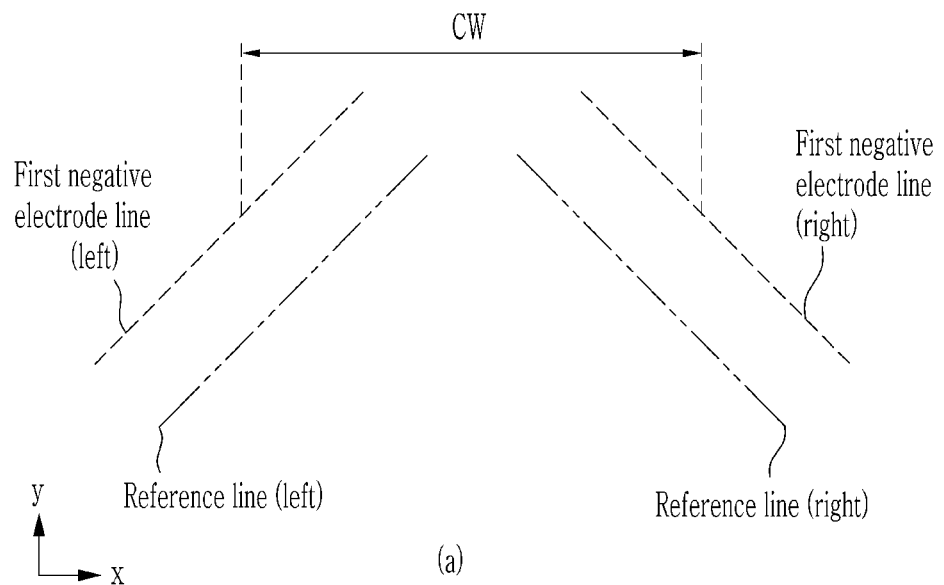
FIG. 10 illustrates, on an XY plane, an individual negative electrode plate by using electrode vision image data and X-ray image data in a battery cell electrode alignment inspection method according to an embodiment of the present disclosure.
Figure 10:
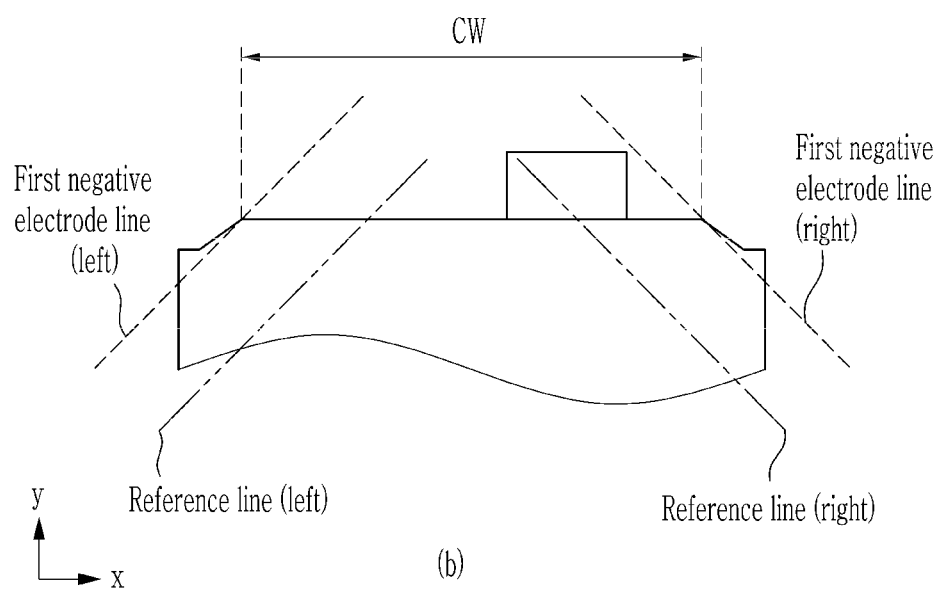
Figure 11:
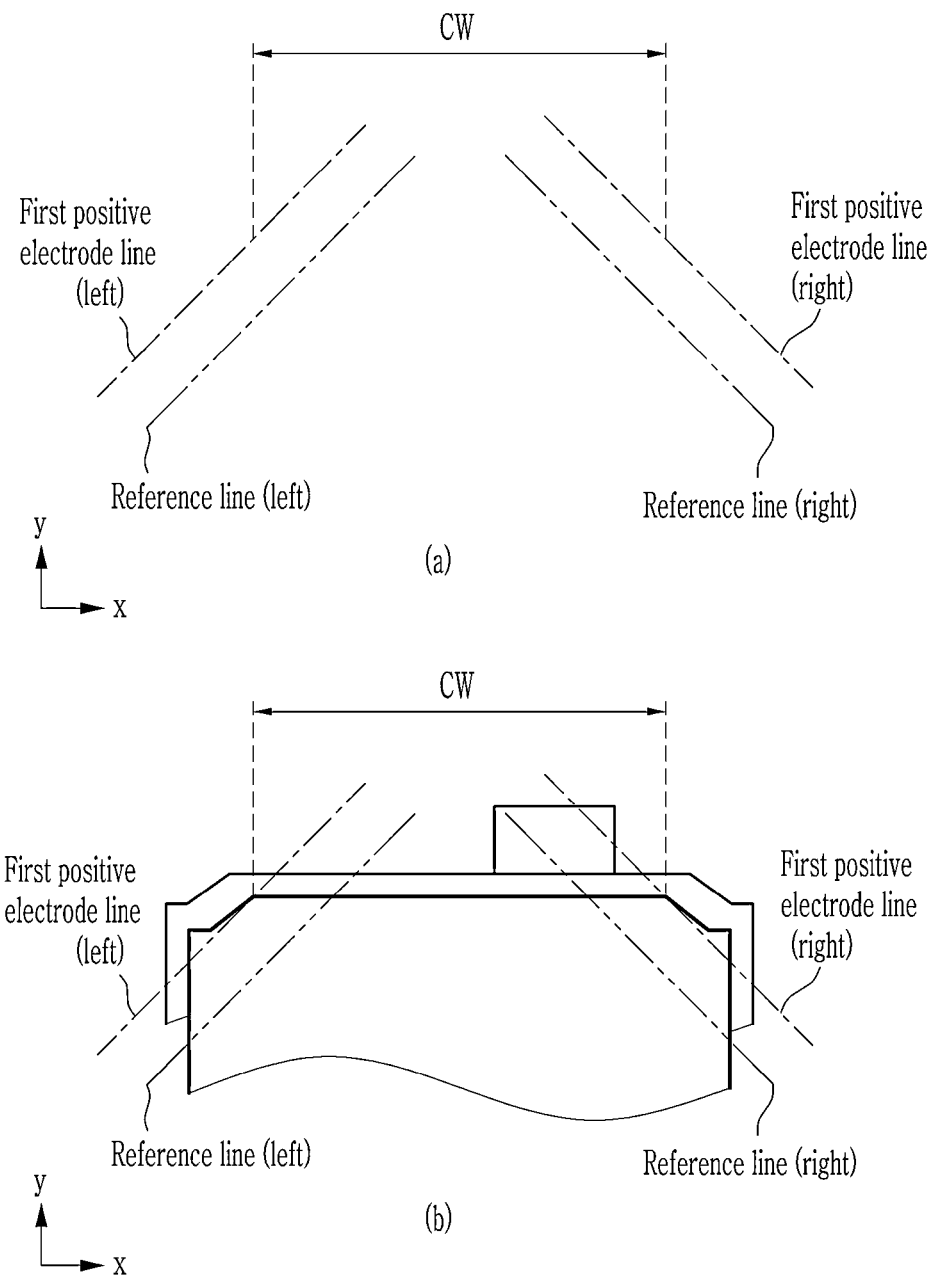
FIG. 11 illustrates, on an XY plane, an individual positive electrode plate by using electrode vision image data and X-ray image data in a battery cell electrode alignment inspection method according to an embodiment of the present disclosure.
Figure 12:
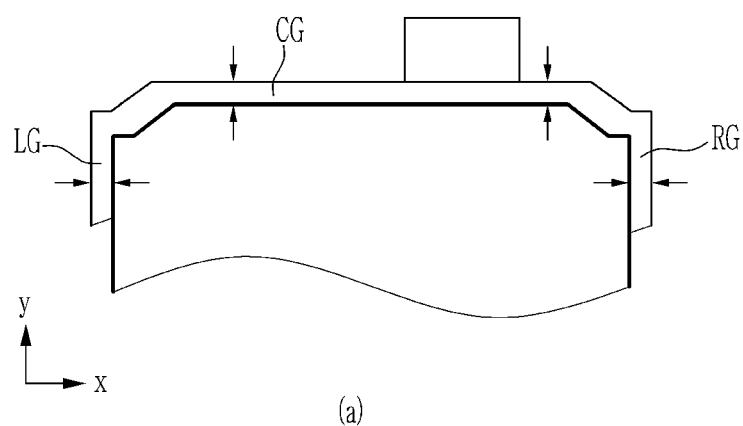
FIG. 12 illustrates a schematic view of calculating a gap between individual negative and positive electrode plates in a battery cell electrode alignment inspection method according to an embodiment of the present disclosure.
Figure 12:
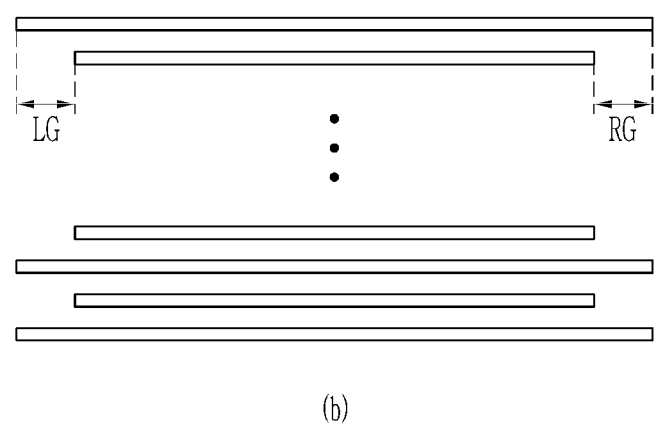

FIG. 10 illustrates, on an XY plane, an individual negative electrode plate by using electrode vision image data and X-ray image data in a battery cell electrode alignment inspection method according to an embodiment of the present disclosure, FIG. 11 illustrates, on an XY plane, an individual positive electrode plate by using electrode vision image data and X-ray image data in a battery cell electrode alignment inspection method according to an embodiment of the present disclosure, and FIG. 12 illustrates a schematic view of calculating a gap between individual negative and positive electrode plates in a battery cell electrode alignment inspection method according to an embodiment of the present disclosure.

Referring to FIG. 10 and FIG. 11, the dimensional data of the individual negative electrode plate 12 and the positive electrode plate 14 obtained in the obtaining of the electrode vision image data (S101) are loaded from the MES server 20 through the scanning of the cell barcode 30, and this dimensional data is merged with the dimensional data obtained in the obtaining of the X-ray image data (S106). That is, a line connecting the inner widths CW of the individual negative electrode plate 12 and positive electrode plate 14 obtained in the obtaining of the electrode vision image data (S101) and a line connecting two points at which both end lines of the individual negative electrode plate 12 and the positive electrode plate 14 obtained in the obtaining of the X-ray image data (S106) meet are fixed to the width of the individual negative electrode plate 12 and positive electrode plate 14 (FIG. 10 (*a*) and FIG. 11 (*a*)), and the images of the individual negative electrode plate 12 and positive electrode plate 14 may be respectively derived based on the widths of the individual negative electrode plate 12 and positive electrode plate 14 to be displayed on the XY plane (FIG. 10 (*b*) and FIG. 11 (*b*)).

Then, as shown in FIG. 12, after overlapping the derived images of the individual negative electrode plate 12 and the positive electrode plate 14, gaps CG, LG, and RG between the end line of the individual negative electrode plate 12 and the end line of the individual positive electrode plate 14 may be calculated (FIGS. 12 (*a*) and (*b*)). As described above, it is possible to derive the images for the plurality of individual negative and positive electrode plates 12 and 14, and to calculate the gaps between the matching closest negative electrode plates 12 and positive electrode plates 14, respectively.

Figure 13:
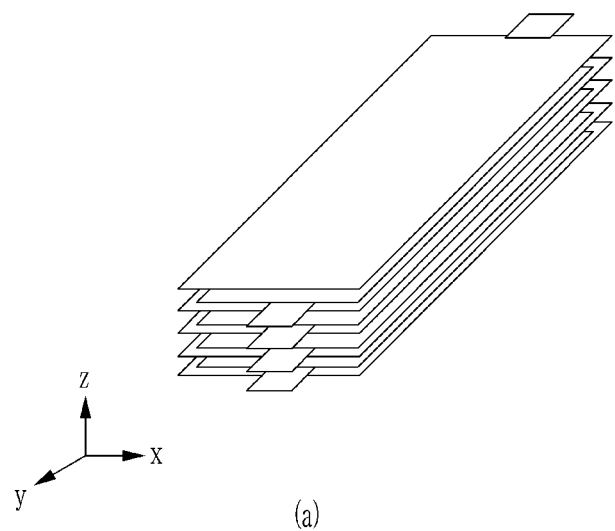
FIG. 13 illustrates a schematic view of a state of showing the individual negative and positive electrode plates illustrated in FIG. 10 and FIG. 11 in an XYZ space and of determining whether an alignment specification is satisfied.
Figure 13:
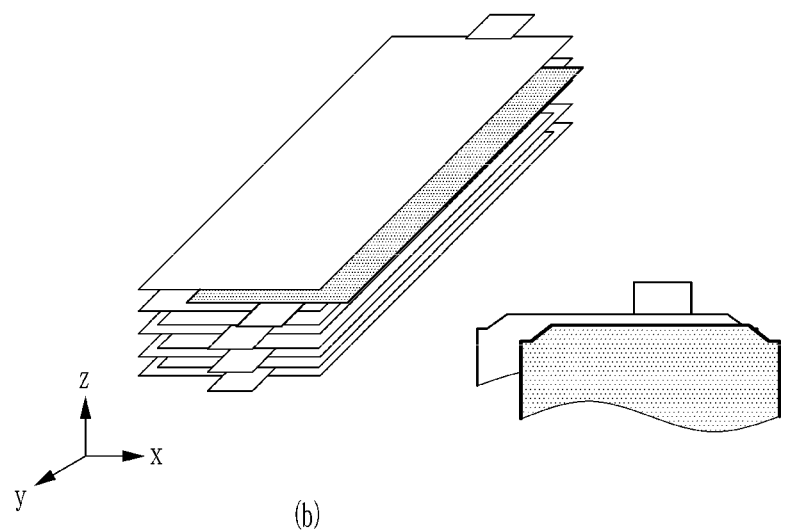

FIG. 13 illustrates a schematic view of a state of showing the individual negative and positive electrode plates illustrated in FIG. 10 and FIG. 11 in an XYZ space and of determining whether an alignment specification is satisfied.

As shown in FIG. 13, the images of the individual negative electrode plate 12 and positive electrode plate 14 may be shown in an XYZ three-dimensional space, and a plurality of images of the individual negative electrode plate 12 and positive electrode plate 14 may be stacked and shown. The calculated gap value between the closest negative electrode plate 12 and positive electrode plate 14 may be calculated as a positive (+) or negative (−) value, and when the gaps between the plurality of individual negative electrode plates 12 and positive electrode plates 14 are calculated and when all of the calculated gap values are consistently positive (+) and are within a predetermined range of values, they are determined to have a good alignment specification (FIG. 13 (*a*)). However, when the calculated gaps between the closest negative electrode plate 12 and positive electrode plate 14 in some area are calculated to have different signs, that is, when the calculated gap value is reversed, the corresponding negative electrode plate 12 or positive electrode plate 14 is determined to have a poor alignment specification as shown in FIG. 13 (*b*).

As described above, according to the present disclosure, it is possible to determine the alignment of the positive and negative electrodes of the jelly roll by merging the electrode vision image data obtained by the vision camera and the X-ray image data obtained by the X-ray detector, so that it is possible to reduce the possibility of false-determination due to lack of the dimensional data and improve the inspection reliability.

In addition, since it is possible to accurately determine the alignment between the closest adjacent ones of the positive and negative electrodes only by X-ray imaging at two corners of the jelly roll, it is possible to reduce the inspection time per jelly roll to increase the production efficiency, and to enhance the product stability.

In addition, since the same inspection method may be applied to various jelly roll manufacturing methods such as folding, stacking, and the like, applicability of the present disclosure is improved, and commonality thereof is enhanced.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A battery cell electrode alignment inspection method for inspecting an alignment state of a jelly roll configured of negative and positive electrode plates and a separator of a battery cell, comprising:
    obtaining electrode vision image data by capturing vision images of individual negative and positive electrode plates configuring the jelly roll by a vision camera;
    obtaining dimensional data of the individual negative and positive electrode plates by analyzing the electrode vision image data;
    storing the obtained dimensional data of the individual negative and positive electrode plates in a server;
    marking a cell barcode for identification of the jelly roll;
    scanning, by a barcode scanner, the cell barcode to receive the dimensional data of the individual negative and positive electrode plates of the jelly roll from the server;
    X-ray-capturing, by an X-ray projector, the jelly roll to obtain X-ray image data of the individual negative and positive electrode plates; and
    substituting the dimensional data of the individual negative and positive electrode plates to the obtained X-ray images of the individual negative and positive electrode plates to derive positions of the individual negative and positive electrode plates and to calculate a gap between closest adjacent ones of the individual negative and positive electrode plates.

2. The battery cell electrode alignment inspection method of claim 1, wherein obtaining the electrode vision image data is performed by capturing the vision images of the individual negative and positive electrode plates by the vision camera in a state in which the negative and positive electrode plates are placed on the separator of the jelly roll, respectively.

3. The battery cell electrode alignment inspection method of claim 2, wherein the jelly roll is manufactured by folding connected separators in one direction or stacking a plurality of separated separators side by side.

4. The battery cell electrode alignment inspection method of claim 1, wherein obtaining the electrode vision image data is performed by stacking the individual negative and positive electrode plates on the separator of the jelly roll after capturing the vision images of the individual negative and positive electrode plates, respectively.

5. The battery cell electrode alignment inspection method of claim 4, wherein the jelly roll is manufactured through z-stacking in which a plurality of the connected separators are folded in a zigzag shape.

6. The battery cell electrode alignment inspection method of claim 1, wherein in marking the cell barcode, the cell barcode is formed on a negative electrode lead surface formed at an end portion of the negative electrode plate or a positive electrode lead surface formed at an end portion of the positive electrode plate.

7. The battery cell electrode alignment inspection method of claim 1, wherein in obtaining the electrode vision image data, length data of cutting widths and an inner width of V-grooves formed at both corners of the individual negative and positive electrode plates are obtained.

8. The battery cell electrode alignment inspection method of claim 7, wherein the cutting width of the V groove, after recognizing end point positions of the individual negative and positive electrode plates from the electrode vision image data and recognizing a cutting edge position from a preset and registered V-groove pattern, is calculated as a length between the end point position and the cutting edge position.

9. The battery cell electrode alignment inspection method of claim 7, wherein the inner width is calculated as a length between the cutting edge positions on both sides of the individual negative and positive electrode plates.

10. The battery cell electrode alignment inspection method of claim 1, wherein in obtaining the X-ray image data, X-ray image data detected by the X-Ray detector is obtained by using X-ray beams that are projected from the X-ray projector toward two points of corner areas on both sides of the jelly roll.

11. The battery cell electrode alignment inspection method of claim 10, wherein the X-ray beam projected from the X-ray projector is incident at an angle of 45° with respect to one surface of the jelly roll toward the X-ray detector.

12. The battery cell electrode alignment inspection method of claim 11, wherein obtaining the X-ray image data includes:
   determining end lines of the individual negative and positive electrode plates in the captured X-ray image; and
   obtaining dimensional data of the individual negative and positive electrode plates by measuring a distance from a preset reference line parallel to the end lines of the individual negative and positive electrode plates.

13. The battery cell electrode alignment inspection method of claim 1, wherein calculating the gap between the individual negative and positive electrode plates includes:
   fixing a line connecting the inner widths of the individual negative and positive electrode plates obtained in the obtaining of the electrode vision image data and a line connecting two points at which both end lines of the individual negative and positive electrode plates obtained in the obtaining of the X-ray image data meet as the widths of the individual negative and positive electrode plates to derive images of the individual negative and positive electrode plates based on the widths of the individual negative and positive electrode plates; and
   calculating, after overlapping the images of the individual negative and positive electrode plates, a gap between an end line of the individual negative electrode plate and an end line of the positive electrode plate.

14. The battery cell electrode alignment inspection method of claim 13, wherein:
   the gap between the individual negative and positive electrode plates is calculated as a gap between the closest adjacent ones of the individual negative and positive electrode plates, and
   when calculating a plurality of the gaps and when a value of the calculated gap is reversed, a corresponding negative or positive electrode plate is determined to be unsatisfactory in alignment specification.

* * * * *